United States Patent [19]

Maekawa et al.

[11] Patent Number: 4,536,071
[45] Date of Patent: Aug. 20, 1985

[54] MOUNT ARRANGEMENT AND INTERCHANGEABLE LENS UNIT FOR PHOTOGRAPHIC CAMERA

[76] Inventors: Yukio Maekawa, 5-3-1-607, Harayamadai Sakai, Osaka Prefecture; Tsuneyo Metabi, 1-29-12-306, Harumidai Sakai, Osaka Prefecture; Masatake Niwa, 2-300-1, Higashi-uenoshibacho, Sakai, Osaka Prefecture, all of Japan

[21] Appl. No.: 645,939

[22] Filed: Aug. 30, 1984

[30] Foreign Application Priority Data

Sep. 2, 1983 [JP] Japan ................... 58-162362

[51] Int. Cl.³ .............................................. G03B 3/10
[52] U.S. Cl. .................... 354/400; 354/455; 354/286
[58] Field of Search ................ 354/400–409, 354/455, 286

[56] References Cited

U.S. PATENT DOCUMENTS

| 4,104,649 | 8/1978 | Tanaka et al. | |
|---|---|---|---|
| 4,357,089 | 11/1982 | Okura et al. | |
| 4,413,894 | 11/1983 | Miki et al. | 354/286 |
| 4,432,627 | 2/1984 | Mizokami | |
| 4,449,807 | 5/1984 | Miki et al. | 354/286 |
| 4,483,603 | 11/1984 | Metahi et al. | 354/286 |

FOREIGN PATENT DOCUMENTS

| 55-12001 | 9/1980 | Japan . |
| 56-60911 | 5/1981 | Japan . |
| 58-83824 | 5/1983 | Japan . |

OTHER PUBLICATIONS

Japanese Magazine Nippon Camera, Dec. 1982, p. 280.

*Primary Examiner*—Russell E. Adams
*Attorney, Agent, or Firm*—Wolder, Gross & Yavner

[57] ABSTRACT

A mount arrangement for a photographic camera which is capable of automatic diaphragm control and automatic focusing includes electrical contacts for transmission of electrical signals between a camera body and an interchangeable lens unit, and mechanical transmission members for the automatic diaphragm control and the automatic focusing and positioning member and recess on and at inner periphery of mount members of the camera body and the lens unit so as not to interfere with each other during the start and the course of the mounting of the lens unit onto the camera body through a bayonet mount device.

7 Claims, 13 Drawing Figures

MOUNT ARRANGEMENT AND INTERCHANGEABLE LENS UNIT FOR PHOTOGRAPHIC CAMERA

BACKGROUND OF THE INVENTION

1. Technical Field

The present invention relates to a mount arrangement for a lens interchangeable type photographic camera which is capable of both automatic diaphragm control and automatic focusing and also relates to an interchangeable lens unit for the camera.

2. Prior Arts

In recent lens interchangeable photographic cameras, various means are needed on and/or in the vicinity of mount members of a camera body and an interchangeable lens unit for transmission of mechanical and electrical signals between the camera body and the interchangeable lens unit with multiplication and improvement of camera functions. Particularly, in a lens interchangeable photographic camera which is adapted to effect automatic diaphragm control and automatic focusing by signals from the camera body, a diaphragm interlocked mechanism, an automatic focusing drive mechanism and electrical contact means for supplying and receiving various electrical signals are needed on and/or in the vicinity of the mount members of the camera body and the lens unit in addition to a positioning mechanism for positioning the lens unit relative to the camera body with the lens unit mounted on the camera body. Thus, the diaphragm interlocked mechanism, the automatic focusing drive mechanism and the electrical contact means are composed of a member or members provided on or in the vicinity of the mount member of the lens unit and a corresponding member or members provided on or in the vicinity of the mount member of the camera body, respectively. However, as there is not a large space permitting the provision of these members on and/or in the vicinity of the mount members without exposing these members to the outside of the camera body and the lens unit and without intercepting the optical path for photographing, it becomes necessary to determine the positions of these members rationally on the whole so that no intereference occurs between the members on the side of the lens unit and the members on the side of the camera body upon the mounting and demounting of the lens unit on and from the camera body and so that the corresponding members are coupled with or brought into contact with one another without fault. Conventionally, a bayonet mount device which couples the lens unit with the camera body through a predetermined angle rotation of the lens unit relative to the camera body is used for the coupling, and therefore this must be also taken into consideration to determine the positions of those members on and/or in the vicinity of the mount members of the camera body and the lens unit.

Hitherto, a photographic camera of the above mentioned type capable of automatic diaphragm control and automatic focusing by signals from a camera body is known by Japanese magazine, the NIPPON CAMERA, December 1982, page 280. With this camera, a positioning member is located at an upper and right side portion of the mount member of the camera body as viewed from the front of the camera body and urged radially inwardly to engage a positioning recess formed on a bayonet claw located at an upper left side portion of the mount member of the lens unit as viewed from the rear of the lens unit with the mounting of the lens unit on the camera body completed. A diaphragm control member to be coupled with a diaphragm interlocked member of the lens unit for automatic diaphragm control is located at the inner peripheral side of a lowermost portion of the mount member of the camera body with its end retreated from the mount surface of the mount member while the diaphragm interlocked member is located at the inner peripheral side of a lowermost portion of the mount member of the lens unit with its rear end projecting from the mount surface of the mount member. Electrical contacts of the camera body to be brought into contact with electrical contacts of the lens unit are located on the mount surface of the mount member of the camera body at an upper and lower left side portion of the mount member as viewed from the front of the camera body while the electrical contacts of the lens unit are located on the mount surface of the mount member of the lens unit at an upper and lower right side portion of the mount member as viewed from the rear of the lens unit with the mounting of the lens unit on the camera body completed. The electrical contacts of the lens unit are normally in a projecting state projecting slightly from the mount surface of the mount member of the lens unit respectively. Furthermore, with the camera, a driving shaft of the camera body to be coupled with a driven shaft of the lens unit for automatic focusing is located on the mount surface of the mount member of the camera body at an immediate left side portion of the mount member as viewed from the front of the camera body while the driven shaft is located on the mount surface of the mount member of the lens unit at an immediate right side portion of the mount member as viewed from the rear of the lens unit.

Other prior arts disclosing a mount arrangement which includes various means arranged on and/or in the vicinity of mount members of a camera body and an interchangeable lens unit for transmission of mechanical and electrical signals between the camera body and the interchangeable lens unit are U.S. Pat. Nos. 4,104,649, 4,432,627, 4,357,089 and 4,449,807, Japanese Patent laid-open publication Nos. Sho. 58-83824 and Sho. 55-120022 and Japanese utility model laid open publication No. Sho. 56-60911.

Although many mount arrangements are known as described above, there is still a room for improvement in the arrangement of the various means on and/or in the vinicity of the mount members of the camera body and interchangeable lens unit, particularly when the camera is to be adapted to effect automatic diaphragm control and automatic focusing in accordance with signals from the camera body.

SUMMARY OF THE INVENTION

It is accordingly an object of the present invention to provide a mount arrangement of a photographic camera adapted to effect automatic diaphragm control and automatic focusing in accordance with signals from a camera body, in which arrangement of members required for the automatic diaphragm control and the automatic focusing and for the positioning of an interchangeable lens unit relative to the camera body is improved over the prior arts and rationally determined.

Another object of the present invention is to provide an interchangeable lens unit for the photographic camera having the mount arrangement with the above feature.

According to a mount arrangement of the present invention, there is provided a bayonet mount device adapted to mount and demount an interchangeable lens unit on and from a camera body through predetermined angle clockwise rotation and counterclockwise rotation of the lens unit relative to the camera body as viewed from the front of the camera, respectively. On the side of the lens unit, a positioning recess is formed on an annular mount face of a lens unit mount member at an immediate left side portion of the lens unit mount member as viewed from the rear of the lens unit with the mounting of the lens unit on the camera body completed, a driven shaft is provided on the mount face of the lens unit mount member at a lower left side portion of the lens unit mount member as viewed from the rear of the lens unit with the mounting of the lens unit on the camera body completed, electrical contacts are provided at the inner peripheral side of an upper portion of the lens unit mount member with the mounting of the lens unit on the camera body completed, and a diaphragm interlocked member is provided at the inner peripheral side of a left side portion of the lens unit mount member as viewed from the rear of the lens unit with the mounting of the lens unit on the camera body completed. The driven shaft is angularly spaced from the positioning recess by an angle larger than the predetermined angle for the mounting and demounting of the lens unit on and from the camera body. The electrical contacts are located rearwardly of the mount face of the lens unit mount member and forwardly of the rear faces of bayonet claws which are formed integrally with the lens unit mount member at a rearmost portion of the lens unit while the diaphragm interlocked member has a rear end portion located rearwardly of the mount face of the lens unit mount member and forwardly of the electrical contacts. On the other hand, on the side of the camera body, a positioning member to be engaged in the positioning recess is provided on an annular mount face of a camera body mount member at an immediate right side portion of the camera body mount member as viewed from the front of the camera body and urged to project from the mount face of the camera body mount member, a driving shaft to be coupled with the driven shaft for automatic focusing is provided on the mount face of the camera body mount member at a lower right side portion of the camera body as viewed from the front of the camera body, electrical contacts to be brought into contact with the electrical contacts of the lens unit for signal transmission between the lens unit and the camera body are provided at the inner peripheral side of an upper portion of the camera body mount member, and a diaphram operating member to be engaged with the diaphram interlocked member for automatic diaphragm control is provided at the inner peripheral side of a right side portion of the camera body mount member as viewed from the front of the camera body. The driving shaft is angularly spaced from the positioning member by the same angle as the angular spacing between the driven shaft and the positioning recess. The electrical contacts of the camera body are located rearwardly of the mount face of the camera body mount member so as to be brought into contact with the electrical contacts of the lens unit with the mounting of the lens unit on the camera body completed. The diaphragm operating member has a front end portion located forwardly of the electrical contacts of the camera body and rearwardly of the mount face of the camera body mount member so as to be engageable with the diaphragm interlocked member with the mounting of the lens unit on the camera body completed.

According to the present invention, the driven shaft and the positioning member do not inferere with one another even in the state before starting the rotation of the lens unit for the mounting thereof on the camera body because of the angular spacing as described above. Similarly, the diaphragm interlocked member and the electrical contacts of the camera body do not interfere with one another during the start and the course of the mounting of the lens unit on the camera body, due to difference in their positions in the forward and rearward direction, i.e., in the direction of the optical axis of the lens unit.

The above and other features and advantages of the present invention will become more apparent from the following description of preferred embodiments of the present invention taken in conjunction with the accompanying drawings.

BRIEF DESCRIPTION OF THE DARWINGS

FIG. 1 is a schematic rear elevational view of a mount portion of an interchangeable lens unit at a mounting completed position, according to one preferred embodiment of the present invention, FIG. 2 is a schematic front elevational view of a mount portion of a camera body according to the preferred embodiment of the present invention, FIG. 3 is a schematic rear elevational view of the mount portion of the lens unit at a mounting starting position, FIGS. 4 and 5 are fragmentary side sectional view of the mount portions respectively showing, in an enlarged scale, a positioning member and its associated mechanism, FIG. 6 is a side sectional view showing a general construction of an automatic focusing drive mechanism provided in the camera body, FIG. 7 is a fragmentary side sectional view of the mechanism of FIG. 6 showing a drawing shaft of the mechanism in a retracted state, FIG. 8 is a schematic diagram explanatory of electrical contacts, and signal feeding and reception between the interchangeable lens and the camera body, FIG. 9 is a schematic front elevational view of the camera body showing the positional relationship between the electrical contacts and a flexible circuit board provided in the camera body, FIG. 10 is a cross section taken along the line X—X in FIG. 1, FIG. 11 is a cross section taken along the line XI—XI in FIG. 2, and FIGS. 12 and 13 are rear elevational views of a mount portion of a modified interchangeable lens unit of the present invention at a mounting completed position and a mounting starting positions, respectively.

DESCRIPTION OF THE PREFERRED EMBODIMENTS

In preferred embodiments as illustrated, the present invention is applied to a photographic camera employing a bayonet mount device which is arranged to connect a mount member 1A of an interchangeable lens unit to a mount member 1B of a camera body through a clockwise rotation of the lens unit, and to disconnect the same through a counterclockwise rotation of the lens unit.

Figure 1:
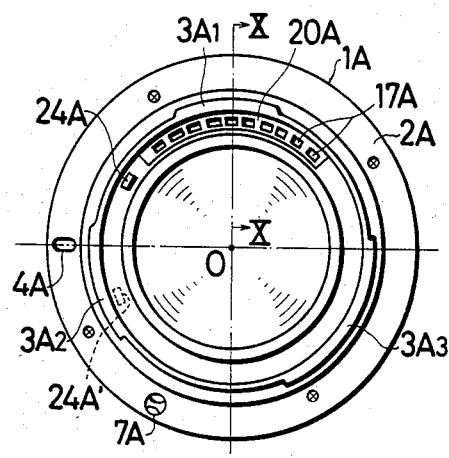
Figure 10:
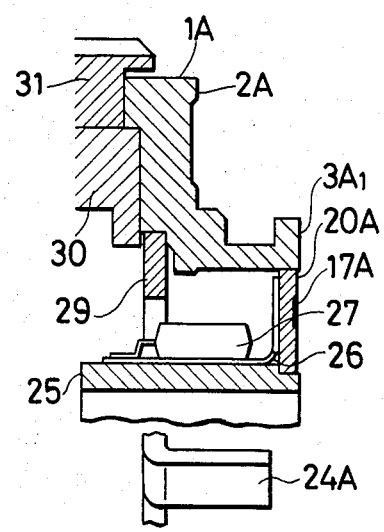

As shown in FIGS. 1 and 10, the mount member 1A of the lens unit has an annular mount face 2A centered at an optical axis 0, and three bayonet claws $3A_1$, $3A_2$ and $3A_3$ formed separately from one another at the rear side of the mount face 2A to radially outwardly project from a small diameter rear end portion of the mount member 1A. The bayonet claws are located at the rearmost position of the lens unit as shown in FIG. 10. It is to be noted here that FIG. 1 shows the state where the mount member 1A of the lens unit is observed from the rear side of the lens unit in a posture in which mounting of the lens unit on the camera body has been completed. In FIG. 1, there is formed a positioning groove or recess 4A on the mount face 2A at the immediate left side lateral portion of the mount member 1A (i.e. at the immediate left side lateral portion of the mount member 1A as viewed from the front side of the camera).

Figure 2:
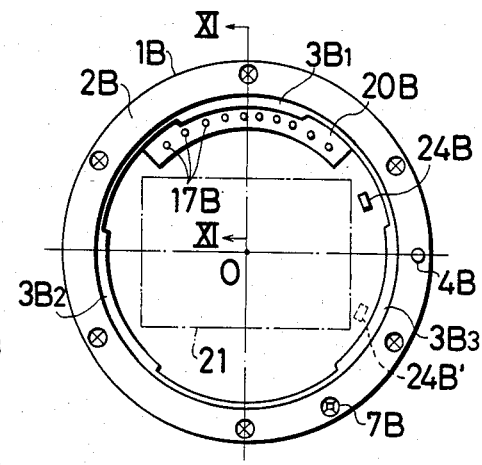
Figure 4:
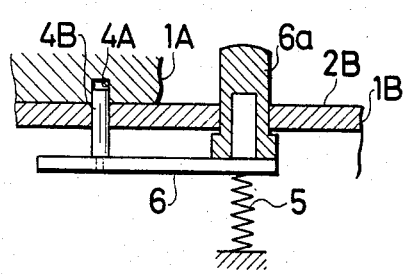
Figure 5:
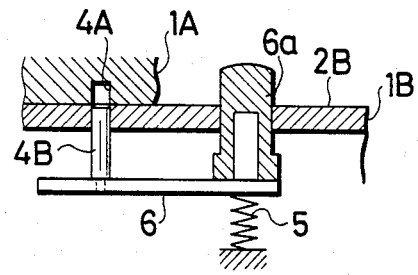
Figure 11:
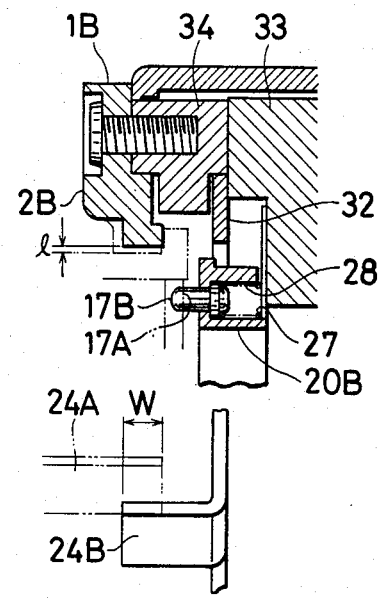

On the other hand, as shown in FIGS. 2 and 11, the mount member 1B of the camera body also has an annular mount face 2B centered at the optical axis 0 and three bayonet claws $3B_1$, $3B_2$ and $3B_3$ formed separately from one another at the rear side of the mount face 2B to radially inwardly project from the inner peripheral portion of the mount member 1B (any of the bayonet claws is not seen in the cross-section of FIG. 11). The bayonet claws $3B_1$, $3B_2$, $3B_3$ are respectively engageable with the bayonet claws $3A_1$, $3A_2$ and $3A_3$ of the mount member 1A. In FIG. 2 showing the state where the mount member 1B is observed from the front side of the camera body, there is provided a positioning pin 4B on the mount face 2B at the immediate right side lateral portion of the mount member 1B. As shown in FIG. 4, this positioning pin 4B is urged by a spring 5 so as to project outwardly from the mount face 2B of the mount member 1B in a direction of the optical axis for engagement in the corresponding positioning groove 4A of the mount member 1A of the lens unit. The engagement of the positioning pin 4B in the positioning groove 4A prevents the lens unit from rotating about the optical axis relative to the camera body. Meanwhile, as shown in FIG. 5, when a release button 6a of a release member 6 is depressed into the camera body, the positioning pin 4B is retreated into the camera body so as to be disengaged from the positioning groove 4A.

Figure 3:
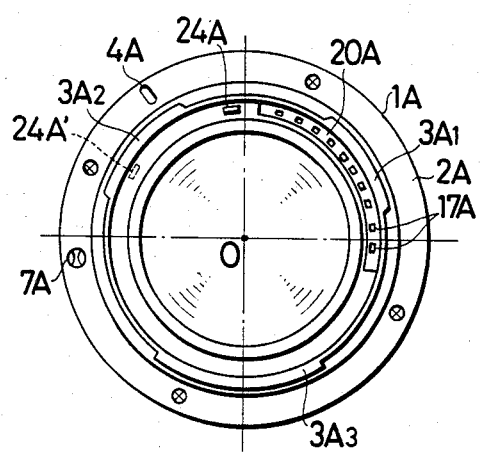

Referring again to FIG. 1 showing the state where the mount member 1A is observed from the rear side of the interchangeable lens unit, on the mount face 2A at a left side lower portion of the mount member 1A, there is provided a driven shaft 7A of an automatic focusing drive mechanism with its axis being directed in a direction of the optical axis. Here, on the assumption that a rotational angle, i.e. mounting rotational angle required to complete the mounting of the interchangeable lens unit on the camera body as shown in FIG. 1 from the state of FIG. 3 is represented by $\theta$, the distance of the driven shaft 7A from the positioning groove 4A is set to be larger, in terms of a circumferential rotational angle, than this rotational angle $\theta$. This means that, when the mount member 1A of the lens unit is in the state before starting rotation for the mounting as shown in FIG. 3, the driven shaft 7A is brought into a position deviated slightly towards the lower side from the position of the positioning pin 4B of the mount member 1B on the camera body shown in FIG. 2.

Moreover, as shown in FIG. 2 on the mount face 2B, at the right lower side portion of the mount member 1B of the camera body there is provided a driving shaft 7B of the automatic focusing drive mechanism with its axis being directed in the direction of the optical axis so that it can be coupled with the driven shaft 1A when the mounting of the lens unit on the camera body is completed.

The spacing between the driving shaft 7B on the mount face 2B of the mount member 1B and the positioning pin 4B should preferably be set at 55° to 70° in terms of the circumferential rotational angle.

Figure 6:
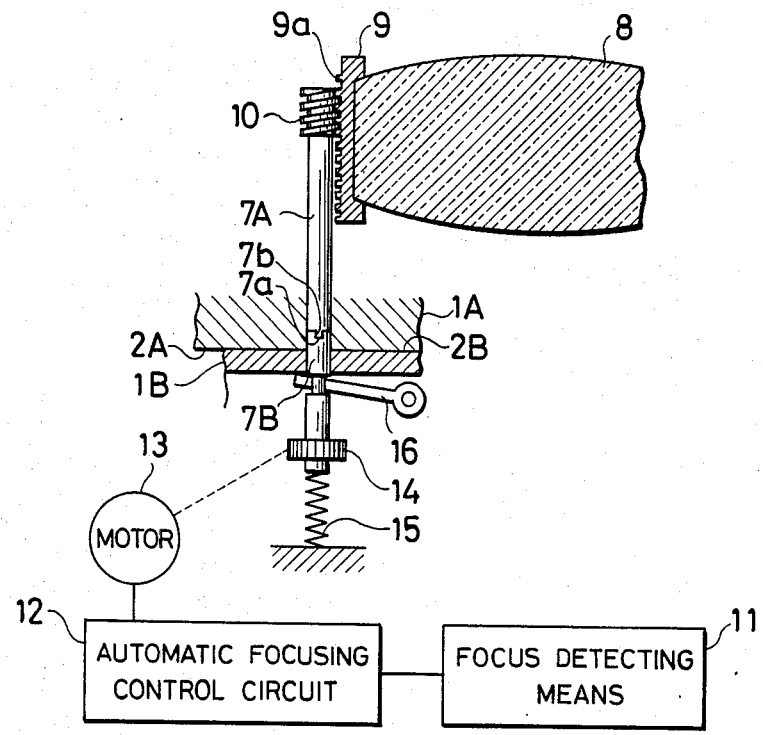
Figure 7:
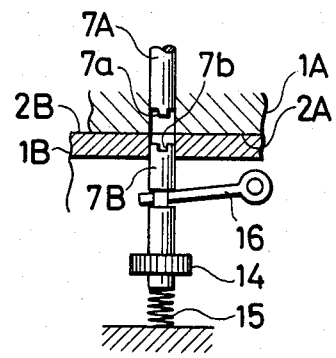

The general construction of the automatic focusing drive mechanism referred to above is shown in FIG. 6. In FIG. 6, the lens unit is provided with a lens 8 which forms a focusing optical system, a lens frame 9 which supports the lens 8, and a rack gear 9a formed at an outer peripheral portion of the lens frame so as to be in mesh with a worm gear 10 formed on the driven shaft 7A. The camera body is provided with a focus detecting means 11 which detects a deviation of the lens 8 from the in-focus position through measurement of light rays having passed through lens 8, and an automatic focusing control circuit 12 which drives a motor 13 in accordance with the amount and direction of the deviation detected by the focus detecting means. The driving of the motor 13 is transmitted to a gear 14 of the driving shaft 7B through an appropriate transmission mechanism (not shown), thereby to rotate the driving shaft 7B. The driving shaft 7B is urged by a spring 15 in the direction of the optical axis so as to project outwardly from the mount face 2B of the mount member 1B. In the mounting completed state of the lens unit, the driving shaft 7B is coupled with the driven shaft 7A of the mount member 1A of the lens unit through engagement of engaging portions 7a and 7b formed on the confronting end faces of the driven shaft and the driving shaft respectively, whereby rotation of the driving shaft 7B is transmitted to the driven shaft 7A. Thus, through the meshing of the worm gear 10 with the rack gear 9a, the lens 8 is displaced toward the in-focus position. The camera body is further provided with a lever 16 associated with a small diameter portion of the driving shaft 7B. This lever 16 is also associated with the release member 6 described earlier and a change-over member (not shown) for change-over between the automatic focusing mode and the manual focusing mode, so as to cause the driving shaft 7B to retreat toward the camera body side against the spring 15 as shown in FIG. 7 when the release member 6 is depressed or when the change-over member is set to the manual focusing mode.

Figure 8:
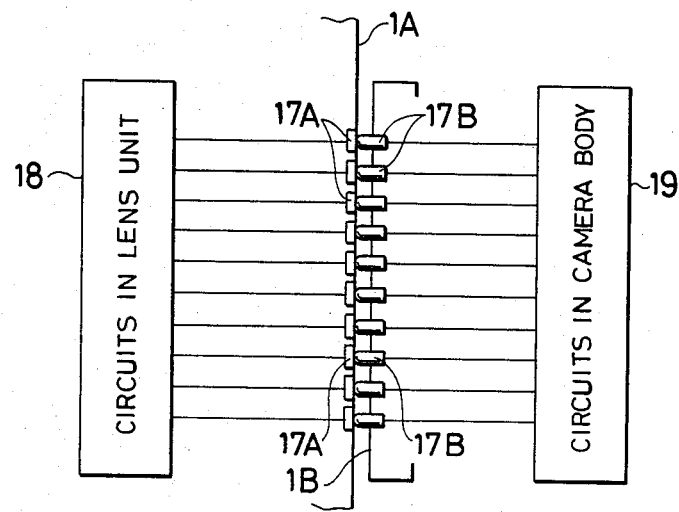
Figure 9:
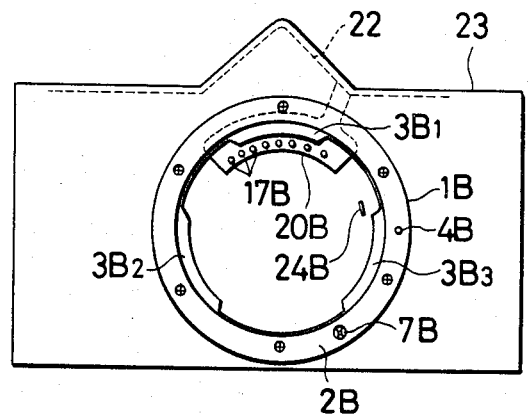

Along the inner peripheral side of upper portions of the mount member 1A and the mount member 1B, a plurality of electrical contacts 17A and 17B provided in pairs are separately disposed, so that in the mounting completed state, the corresponding electrical contacts 17A and 17B are brought into contact with each other. As shown in a schematic diagram of FIG. 8, these electrical contacts 17A and 17B are intended to effect signal transmission between a circuit 18 in the lens unit and a circuit 19 in the camera body. The circuit 18 includes a ROM (read only memory) storing various signals inherent to individual lens units and required for the automatic diaphragm control and the automatic focusing (for example, a signal representative of a fully open aperture value of the lens, and a signal representative of the amount of the shift of the lens 8 per each rotation of the driven shaft 7A) and circuit means for selectively reading the signals form the ROM. The circuit 19 includes a power source, a clock pulse generator for generating clock pulses to be fed to the circuit means in the circuit 18, an automatic diaphragm control circuit and the automatic focusing circuit 12, etc. Most parts of the circuit 19 is formed by a CPU (central processing unit). In FIGS. 1 and 2, numerals 20A and 20B represent electrically insulating substrates provided with the electrical contacts 17A and 17B respectively. These substrates are formed into an arcuate shape extending along the inner peripheral sides of the mount members 1A and 1B, and disposed in such a position retreated upwards from a rectangular picture frame 21 of the camera body shown in one-dot-chain lines in FIG. 2. Accordingly, the path of an effective light flux to expose a film surface through the picture frame 21 may be secured, with a harmful reflected light not being readily produced. Meanwhile, as shown in FIG. 9, a flexible circuit board 22 on which circuits of the camera body including the circuit 19 is formed and mounted is provided below an upper cover 23 of the camera body and above a pentagonal prism (not shown) without any conflict with a shutter dial and an ASA sensitivity or film speed dial on the upper cover and various display mechanisms within a view finder. By the above arrangement, the electrical contacts 17B are located in the vicinity of the flexible circuit board 22, without obstructing constructions of other members, whereby connections between the electrical contacts 17B and the flexible circuit board 22 may be readily effected in an efficient manner. The respective electrical contacts 17A and 17B are provided with such sizes and disposing intervals therebetween that, under the mounting completed state, non-contact or erroneous contact may not take place due to looseness or side plays of the mount portions, and dimensional errors in the parts employed, etc.

Furthermore, in FIG. 1 showing the state in which the mount member 1A is observed from the rear side of the interchangeable lens unit, at the inner peripheral region of a left side portion of the mount member 1A (i.e., the right side portion of the mount member when observed from the front side of the camera) there is provided a diaphragm interlocked member 24A in the lens unit so that it is angularly spaced from the electrical contacts 17A. The distance of the diaphragm interlocked member 24A from the optical axis 0 is adapted to be close to the distance of the electrical contacts 17A from the optical axis 0. In FIG. 1, the diaphragm interlocked member 24A has a position shown by a solid line as a fully-open or maximum diaphragm aperture position, and another position 24A represented by a dotted line as a minimum diaphragm aperture position. Thus, the diaphragm interlocked member 24A is movable from the fully open aperture position to the minimum diaphragm aperture position for stopping down a diaphragm (not shown) provided in the lens unit.

Moreover, as shown in FIG. 2, at the inner peripheral side of a right side portion of the mount member 1B of the camera body, there is provided a diaphragm operating member 24B, so that it engages with the diaphragm interlocked member 24A under the mounting completed state. With respect to the diaphragm operating member 24B within the camera body also, the distance of its position from the optical axis 0 is adapted to be close to the distance of the electrical contacts 17B from the optical axis 0. In FIG. 2, the diaphragm operating member 24B has a position shown by a solid line as the fully-open diaphragm aperture position, and another position 24B' denoted by a dotted line as a minimum diaphragm aperture position. It is to be noted that the diaphragm operating member 24B engaging the diaphragm interlocked member 24A is normally held in the fully open diaphragm aperture position. However, upon start of a photographing operation, it is moved towards the minimum diaphragm position due to its stopping-down tendency, followed by the diaphragm interlocked member.

As shown in FIG. 10, in the disposition in the direction of the optical axis, the electrical contacts 17A of the lens unit are provided in position closer to the camera body side than the mount face 2A of the mount member 1A and closer to the mount face 2A than the rear surface of the bayonet claw 3A. In FIG. 10, a numeral 25 represents a decorative tube provided in the inner periphery of the mount member 1A, and between this decorative tube 25 and the mount member 1A, the insulating substrate 20A is held. At the outer peripheral portion of the decorative tube 25, a flexible circuit board 26 on which the circuit 18 is formed and mounted is provided for connection with the electrical contacts 17B. Represented by a numeral 27 is an IC in the circuit 18 provided with the ROM. As shown in FIG. 11, in the disposition in the direction of the optical axis, the electrical contacts 17B within the camera body are disposed in position deviated rearwards, i.e., towards a predetermined image forming plane (film plane) in the camera, from the mount face 2B of the mount member 1B. In FIG. 11, the camera body is provided with a spring 27 which is disposed in an opening 28 of the insulating substrate 20B for urging the electrical contacts 17B forwards in the direction of the optical axis. By the urging force of this spring 27, in the state where the interchangeable lens unit is disconnected from the camera body, the electrical contacts 17B protrude forwards by a predetermined degree beyond the position shown by an imaginary line in FIG. 11. As the electrical contacts 17A of the lens unit in the mounting completed state occupy the position shown in the imaginary line, the electrical contacts 17A and 17B are brought into contact with each other under the urging force of the spring 27. As the electrical contacts 17A and 17B are not disposed at the rearmost position of the lens unit and at the forwardmost position of the camera body with respect to the optical axis, respectively, even when the lens unit and the camera body having been disconnected from one another are placed with their mount members directed downwards respectively, the electrical contacts 17A and 17B do not abut on the placing surface, thus being free from any damages.

As shown in FIG. 10, the disposition of the diaphragm interlocked member 24A of the lens unit in the direction of the optical axis is so set that its rear end portion in the axial direction is positioned between the mount face 2A of the mount member 1A and the electrical contacts 17A. In FIG. 10, a numeral 29 represents a diaphragm operating ring integral with the diaphragm interlocked member 24A, and arranged to be rotatable about the optical axis for stopping down the diaphragm aperture. Fitted over an outer periphery of a lens barrel 30 is a diaphragm presetting ring 31 which is used to preset a diaphragm aperture, i.e., the maximum extent of the stopping down rotation of the diaphragm operating ring 29. As the diaphragm interlocked member 24A has a stopping tendency, the diaphragm operating ring 29 is rotated to a position to stop down the diaphragm aperture to the preset aperture value, when the lens unit is not connected with the camera body.

As shown in FIG. 11, also with respect to the disposition of the diaphragm operating member 24B within the camera body in the direction of the optical axis, the setting is so made that its front end portion in the axial direction is located between the mount face 2B of the mount member 1B and the electrical contacts 17B of the camera body. In FIG. 11, the camera body is provided with a diaphragm aperture control ring 32 integral with the diaphragm operating member 24B and arranged to be rotatable about the optical axis for interconnection with a diaphragm aperture determining mechanism (not shown) within the camera body. The diaphragm aperture determining mechanism stops the rotation of diaphragm aperture control ring 32 to stop the movement of the diaphragm operating member 24B and thus the movement of the diaphragm interlocked member 24A in response to a diaphragm stop signal generated by the automatic diaphragm control cirucit upon achievement of a proper diaphragm aperture. Represented by a numeral 33 is a front frame of the camera body provided, on its front face, with a fixed ring 34 to which the mount member 1B is fixed. Between the diaphragm interlocked member 24A and the diaphragm operating member 24B, a sufficient engaging margin as shown by a symbol W in FIG. 11 is provided in the mounting completed state.

In the state before staring of the mounting, in which the mount member 1A of the lens unit in the posture of FIG. 3 is inserted into the mount member 1B on the camera in the posture of FIG. 2, if the diaphragm presetting ring 31 is set at the fully-open diaphragm aperture value, the diaphragm interlocked member 24A in the lens unit is located at an upper region as indicated by a solid line in FIG. 3 so as to be overlapped with the electrical contacts 17B on the mount member 18 of the camera body. However, the rear end portion of the diaphragm interlocked member 24A is located forwardly of the electrical contacts 17A of the lens unit in the direction of the optical axis, so that there is no possibility that the diaphragm interlocked member 24A of the lens unit and the electrical contact 17B of the camera body interfere with each other during the starting and the course of the mounting thereof onto the camera body.

Figure 12:
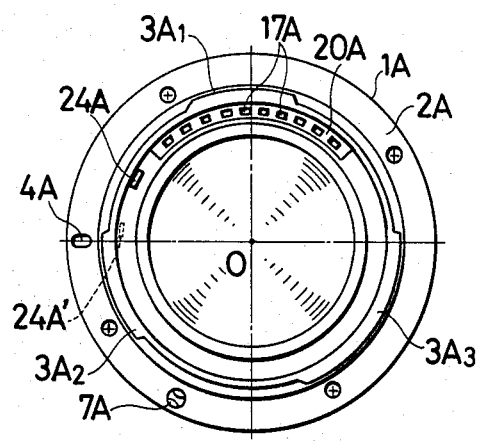
Figure 13:
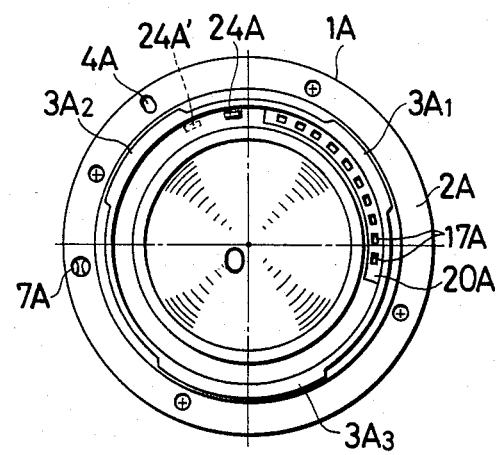

Incidentally, there are some interchangeable lens units which are not provided with the diaphragm presetting ring 31. In the lens unit as described above, the diaphragm interlocked member 24A is always stopped down to the minimum diaphragm aperture position shown by the numeral 24A' in FIGS. 1 and 3, in the state before the mounting. Accordingly, it seems that there is no possibility that the member 24A and the electrical contacts 17B overlap with one another even with the state before the starting of the mounting of the lens unit onto the camera body. However, if the number of stages or steps for the stop-down from the fully-open diaphragm aperture to the minimum diaphragm aperture is small, the minimum diaphragm aperture position of the diaphragm interlocked member 24A is not so far spaced apart from the fully-open diaphragm aperture position as shown in FIGS. 12 and 13. Therefore, in the state before starting the mounting as shown in FIG. 13, the diaphragm interlocked member 24A located at the minimum diaphragm aperture position 24A' comes to overlapped with the electrical contacts 17B of the camera body, so that it becomes necessary to set the disposition of the diaphragm interlocked member 24A in the direction of the optical axis in the same manner as described earlier, with respect to the lens unit having the diaphragm presetting ring 31.

In summary, the mount arrangement of the present invention has the following advantages:

(a) Since the automatic focusing drive and driven shafts 7A, 7B are provided on the mount faces 2A and 2B at the right side lower portions of the mount members 1A and 1B as observed from the front side of the camera, the driving motor 13 and the transmitting mechanism for transmitting the drive force from the motor to the driving shaft 7B may be readily disposed at a lower room space of the camera body.

(b) The electrical contacts 17A, 17B are disposed along the inner peripheral side of an upper portion of the mount members 1A and 1B to retreat upwards from the rectangular picture frame 21 of the camera body while the diaphragm interlocked member 24A and the diaphragm operating member 24B are disposed at the inner pheripheral side of a right side portion of the mount members 1A and 1B to retreat rightwards from the rectangular picture frame 21 as viewed from the camera front side, so that the path of the effective light flux to expose a film surface through the picture frame is readily secured, and harmful reflected light is not easily produced. Accordingly, there is no necessity to provide a special light shielding treatment, etc. Moreover, since these electrical contacts 17A, 17B and diaphragm interlocked and operating members 24A, 24B are spaced from the optical axis by substantially the same distance, it is possible to mount on the camera body a large diameter lens unit with a short back focus and a large diameter rear lens, and even a ultra-telephoto lens unit with a small exist angle without interception of the effective light flux. Furthermore, it is generally required to provide some looseness or play between the radially facing fitting surfaces of the mount members 1A and 1B to allow smooth attaching or detaching operations (see FIG. 11). Such looseness may result in increase in a positional error of the diaphragm interlocked member 24A in the circumferential direction as the distance from the diaphragm interlocked member 24A to the positioning recess 4A increases and the error become the maximum where the diaphragm interlocked member 24A is disposed diametrically opposite to the positioning recess 4A. However, according to the present invention, the diaphragm interlocked member 24A is disposed close to the positioning recess 4A, so that the error becomes small, resulting in improvement of the diaphragm aperture control accuracy.

(c) The electrical contacts 17A and 17B, the diaphragm interlocked member 24A and the diaphragm operating member 24B are provided in positions surrounded by the mount members 1A and 1B so as to be retreated in the lens unit and the camera body. Accordingly, under the state where the lens unit is mounted on the camera body, these members are completely covered or concealed by the mount members, so that they can be protected from adhesion of dusts and dirts without addition of any special protecting member. In addition, with the lens unit demounted from the camera body, the above members do not project out of the mount members 1A and 1B so that they are free from any damages if placed carelessly on a desk. Accordingly, for the members 24A, 24B it is not required to take into account the case where unexpected loads or impacts applied thereto, and they may be made of a material having a minimum strength requried for their original function (i.e., interconnection between the rings 29 and 32). This means that the mass of members 24A and 24B may be reduced, resulting in improvement of the diaphragm control accuracy without retardation of the diaphragm aperture determination.

(d) Since the electrical contacts 17A and the diaphragm interlocked member 24A are so set, in their disposition in the optical axis direction, that, during the start and the course of the mounting of the lens unit onto the camera body, the electrical contacts 17A do not interfere with the diaphram interlocked member 24A. More freedom is assured in the designing of the number of electrical contacts, stroke of the diaphragm interlocked member per one stage of stop-down, and the rotational angle for the mounting of the lens unit onto the camera body.

(e) Since the angular spacing between the driven shaft 7A and the positioning recess 4A and that between the driving shaft 7B and the positioning member 4B are larger than the angle of the rotation of the lens unit for the mounting and demounting thereof on and from the camera body, no interference occurs between the driven shaft 7A and the positioning member 4B even in the state before the rotation of the lens unit for the mounting.

(f) At the inner peripheral side of a lower portion and a left portion of the mount members 1A and 1B as viewed from the front of the camera, there is left a room space sufficient for allowing disposition of additional signal transmitting and receiving members depending on needs in future.

What is claimed is:

1. In a lens interchangeable photographic camera capable of automatic diaphragm control and automatic focusing and including a bayonet mount device which is adapted to mount and demount an interchangeable lens unit to and from a camera body through predetermined angle clockwise rotation and counterclockwise rotation of said lens unit relative to said camera body as viewed from the front of said camera, respectively, a mount arrangement comprising:

a lens unit mount member fixedly provided on said lens unit, and having bayonet claws formed at a rearmost portion of said lens unit and an annular mount face formed forwardly of said bayonet claws;

a camera body mount member fixedly provided on said camera body, and having an annular mount face formed at a forwardmost portion of said camera body so as to be brought into contact with said mount face of said lens unit mount member with the mounting of said lens unit on said camera body completed and bayonet claws formed rearwardly of said mount face of said camera body mount member so as to be engageable with said bayonet claws of said lens unit mount member, said bayonet claws of said lens unit mount member and said bayonet claws of said camera body mount member constituting said bayonet mount device;

a positioning recess formed on said mount face of said lens unit mount member at an immediate left side portion of said lens unit mount member as viewed from the rear of said lens unit with the mounting of said lens unit on said camera body completed;

a positioning member provided on said mount face of said camera body mount member at an immediate right side portion of said camera body mount member and urged to project from said mount face of said camera body mount member for engaging said positioning recess with the mounting of said lens unit on said camera body completed;

a driven shaft for the automatic focusing, provided on said mount face of said lens unit mount member at a lower left side portion of said lens unit mount member as viewed from the rear of said lens unit with the mounting of said lens unit on said camera body completed and angularly spaced from said positioning recess by an angle which is larger than said predetermined angle for the mounting and demounting of said lens unit to and from said camera body;

a driving shaft for the automatic focusing, provided on said mount face of said camera body mount member at a lower right side portion of said camera body mount member as viewed from the front of said camera body and arranged to be engageable with said driven shaft with the mounting of said lens unit on said camera body completed for driving said driven shaft;

lens unit electrical contacts provided along the inner peripheral side of the upper portion of said lens unit mount member with the mounting of said lens unit on said camera body completed and arranged rearwardly of said mount face of said lens unit mount member and forwardly of the rear faces of said bayonet claws of said lens unit mount member;

camera body electrical contacts provided along the inner peripheral side of an upper portion of said camera body mount member and arranged rearwardly of said mount face of said camera body mount member so as to be brought into contact with said lens unit electrical contacts with the mounting of said lens unit on said camera body completed for signal transmission between said lens unit and said camera body;

a diaphragm interlocked member for the automatic diaphragm control, provided at the inner peripheral side of a left side portion of said lens unit mount member as viewed from the rear of said lens unit with the mounting of said lens unit on said camera body completed and having a rear end portion arranged rearwardly of said mount face of said lens unit mount member and forwardly of said lens unit electrical contacts so as not to interfere with said camera body electrical contacts during the start and the course of the mounting of said lens unit on said camera body; and a diaphragm operating member for the automatic diaphragm control, provided at the inner peripheral side of a right side portion of said camera body mount member as viewed from the front of said camera body and having a front end arranged rearwardly of said mount face of said camera body mount member and forwardly of said electrical contacts for said camera body, said rear end portion of said diaphragm interlocked member and said front end portion of said diaphragm operating member being engageable with one another with the mounting of said lens unit on said camera body completed.

2. A mount arrangement as defined in claim 1, wherein said camera body includes a rectangular picture frame and said camera body electrical contacts are retreated upwards from said rectangular picture frame while said diaphragm operating member is retreated rightwards from said rectangular picture frame as viewed from the front of said camera body.

3. A mount arrangement as defined in claim 2, wherein the angular spacing between said positioning recess and said driven shaft and that between said positioning member and said driving shaft are the same and fall in the range from 55° to 70°.

4. A mount arrangement as defined in claim 3, further comprising:
- a manually operable release member provided in the vicinity of said camera body mount member, and
- means for disengaging said positioning member from said positioning recess in response to a manual operation of said release member.

5. A mount arrangement as defined in claim 3, wherein said camera body electrical contacts are urged forwards so as to be normally located at a position where they do not interfere with said diaphragm interlocked member during the start and the course of the connection of said lens unit to said camera body and so as to be depressed against its urge by said lens unit electrical contacts with the connection of said lens unit to said camera body completed.

6. An interchangeable lens unit for use in a photographic camera capable of automatic diaphragm control and automatic focusing and including a bayonet mount device which is adapted to mount and demount said lens unit on and from a camera body of said camera through predetermined clockwise rotation and counterclockwise rotation of said lens unit relative to said camera body as viewed from the front of said camera, respectively, said lens unit comprising:
- a mount member fixedly provided on said lens unit and having an annular mount face;
- bayonet claws provided integrally with said mount member to be located at a rearmost portion of said lens unit;
- a positioning recess formed on said mount face at an immediate left side portion of said mount member as viewed from the rear of said lens unit with the mounting of said lens unit on said camera body completed;
- a driven shaft for the automatic focusing, provided on said mount face at a lower left side portion of said mount member as viewed from the rear of said lens unit with the mounting of said lens unit on said camera body completed and angularly spaced from said positioning recess by an angle which is larger than said predetermined angle for the mounting and demounting of said lens unit on and from said camera body;
- electrical contacts for signal transmission between said lens unit and said camera body, provided at the inner peripheral side of an upper portion of said mount member with the mounting of said lens unit on said camera body completed and arranged rearwardly of said mount face and forwardly of the rear faces of said bayonet claws; and
- a diaphragm interlocked member for the automatic diaphragm control, provided at the inner peripheral side of a left side portion of said mount member as viewed from the rear of said lens unit with the mounting of said lens unit on said camera body completed, and having a rear end portion arranged rearwardly of said mount face and forwardly of said electrical contacts.

7. An interchangeable lens unit as defined in claim 6, wherein the angular spacing between said positioning recess and said driven shaft fall within the range from 55° to 70°.

* * * * *

UNITED STATES PATENT AND TRADEMARK OFFICE
CERTIFICATE OF CORRECTION

PATENT NO. : 4,536,071
DATED : Aug. 20, 1985
INVENTOR(S) : Yukio Maekawa; Tsuneyo Metabi; Masatake Niwa It is certified that error appears in the above-identified patent and that said Letters Patent are hereby corrected as shown below:

On the title page:
The Assignee of the patent is:

Minolta Camera Kabushiki Kaisha,
Osaka, Japan

Signed and Sealed this

Sixteenth Day of December, 1986

Attest:

DONALD J. QUIGG

*Attesting Officer*      *Commissioner of Patents and Trademarks*